INVENTOR
Hermon Hosmer Scott
BY David Rines
ATTORNEY

Aug. 12, 1952

H. H. SCOTT 2,606,969

METHOD AND SYSTEM FOR REDUCING NOISE IN THE TRANSMISSION OF ELECTRIC SIGNALS

Filed Jan. 17, 1946

9 Sheets-Sheet 2

INVENTOR
Hermon Hosmer Scott
BY David Rines
ATTORNEY

INVENTOR
Hermon Hosmer Scott
BY David Rines
ATTORNEY

Aug. 12, 1952 H. H. SCOTT 2,606,969

METHOD AND SYSTEM FOR REDUCING NOISE IN THE TRANSMISSION OF ELECTRIC SIGNALS

Filed Jan. 17, 1946 9 Sheets-Sheet 4

INVENTOR.
Hermon Hosmer Scott
BY David Rines
ATTORNEY

Aug. 12, 1952 H. H. SCOTT 2,606,969

METHOD AND SYSTEM FOR REDUCING NOISE IN THE TRANSMISSION OF ELECTRIC SIGNALS

Filed Jan. 17, 1946 9 Sheets-Sheet 5

INVENTOR.
Hermon Hosmer Scott
BY David Rines
ATTORNEY

INVENTOR.
Hermon Hosmer Scott
BY David Rines
ATTORNEY

Aug. 12, 1952 H. H. SCOTT 2,606,969

METHOD AND SYSTEM FOR REDUCING NOISE IN THE TRANSMISSION OF ELECTRIC SIGNALS

Filed Jan. 17, 1946 9 Sheets-Sheet 7

INVENTOR.
Hermon Hosmer Scott
BY David Rines
ATTORNEY

Aug. 12, 1952 H. H. SCOTT 2,606,969

METHOD AND SYSTEM FOR REDUCING NOISE IN THE TRANSMISSION OF ELECTRIC SIGNALS

Filed Jan. 17, 1946 9 Sheets-Sheet 8

INVENTOR.
Hermon Hosmer Scott
BY David Rines
ATTORNEY

INVENTOR.
Hermon Hosmer Scott.
BY David Rines
ATTORNEY.

Patented Aug. 12, 1952

2,606,969

UNITED STATES PATENT OFFICE 2,606,969

METHOD AND SYSTEM FOR REDUCING NOISE IN THE TRANSMISSION OF ELECTRIC SIGNALS

Hermon H. Scott, Lincoln, Mass., assignor, by mesne assignments, to Myron T. Smith, Concord, Mass., trustee Application January 17, 1946, Serial No. 641,673

9 Claims. (Cl. 178—44)

Figure 1:
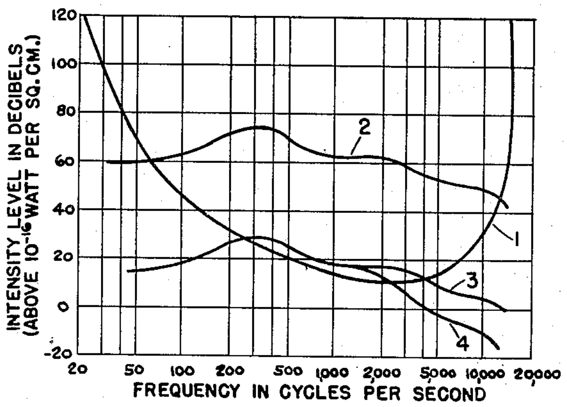

The present invention relates to electric methods and systems, and more particularly to methods of and systems for attenuating or suppressing background noise, interference, and other spurious disturbances during the transmission, the recording, or the reproduction of speech, music, video, and other signals. The term "reducing" or its equivalent will hereinafter be employed generically to include either attenuating or completely suppressing.

Background noise and other extraneous disturbances, at one time or another, are attendant upon practically every form of transmission, recording, or reproducing system. They occur, for example, during the transmission and the reception of the sight and sound channels of television, the presentation of sound-motion pictures, the transmission and reception of signals by wire, telephone, cable, or radio, in relay circuits, and in the reproduction of all types of recording. They have heretofore been attenuated at the expense of seriously impairing the fidelity with which the desired signals have been transmitted. The customary practice has been to adjust the frequency-response characteristic or to restrict the frequency range of the system so as to provide what has been considered to be the best compromise between the fidelity of the transmission and the suppression of the noise. The compromise has not, however, been satisfactory.

To take an illustration from phonograph-record reproduction, the interference has consisted very largely of the annoying surface noises caused by the scratch of the stylus or needle. These scratch noises usually accompany the high-frequency components only of the reproduced talk or music, which high frequencies comprise mainly harmonics of the lower frequencies. In recognition of this fact, the compromise proposed was the elimination of these high frequencies altogether. This, however, resulted in serious effects upon the brilliance and the naturalness of the music.

The restriction upon the fidelity of the reproduction was particularly noticeable at the high-volume or high-intensity levels of the reproduced signal; at the low-intensity levels, the human ear does not seem to notice the absence of the high-frequency components of sound. As, moreover, the spurious noises are very effectively masked, so as to be nearly or quite imperceptible to the human ear, when the speech or music reproduced by the phonograph record is loud, it was proposed to attenuate the high-frequency components at the low-volume levels only; and to permit reproduction of the high-frequency range at the high levels, either of the high-frequency components themselves, or of the reproduced signals as a whole.

This modification of the originally proposed compromise, however, can be practically availed of only when the desired high-frequency-signal components are at a very high level compared to the noise components, or are accompanied by low-frequency components of substantial volume or intensity. What is meant by "low-frequency components" in this specification will be explained hereinafter. When these loud low-frequency components are present, as before stated, the ear does not notice the high-frequency-noise components. The proposed modification cannot be availed of generally, therefore, when the response to the high frequencies is unaccompanied by a signal at low frequencies of substantial level.

In these previously proposed systems, high-level high-frequency interference signals have been reproduced without any attenuation thereof, because their very presence allows the system to reproduce the high-frequency ranges. Systems depending for their effectiveness upon control in accordance with the level in the high-frequency range are fundamentally defective in that the greater portion of the control may be exercised by the noise-frequency components themselves, if the noise level is high enough. This permits of reproduction in the high-frequency range with accompanying spurious noise, when the level of the desired signal is low; and particularly so when there is no desired signal at all to be reproduced in that high-frequency range other than the undesired noise. During such periods of silence of the desired signal, even between notes or musical phrases, the high-frequency scratch is very annoyingly heard, and it is all that is then heard. It is very desirable to attenuate the very audible needle scratch that many accompany that music silence. The same considerations apply, however, even in periods of nonsilence, where the volume level of the reproduced music contains no loud low-frequency components, and when most of the high-frequency musical components exist only at levels too low to be heard.

It is accordingly an object of the present invention to provide a new and improved method of and system for reducing background noise or other interference during transmission, recording, reproduction, and the like, that shall retain practically a high degree of apparent fidelity.

To the attainment of this end, a feature of the invention resides in reducing the response in the high-frequency region, not in accordance with the level of the higher frequencies, and not in accordance with the level of all the frequencies as a whole, as has heretofore been proposed, but rather in accordance with the level of some of the low frequencies, or the frequencies below the range of the high frequencies that are being controlled. The noise is suppressed when the level of these low frequencies is so low that the signal cannot mask the noise; or so low as to indicate that any probable level of the higher frequencies, insofar as the desired signal is concerned, is below the threshold of hearing. The noise is thus reduced at low-volume levels by reducing the range of the high-frequency overtones that are not normally heard by the ear except at the high-volume levels. Better suppression of noise, with less effect upon the reproduction of the higher treble tones, and with no apparent decrease in the quality of reproduction, is thus attained. If the signal is such that the level of the low-frequency components is high compared to that of the high-frequency components and, particularly, the noise components, the described operation, of course, takes place when the level of the signal as a whole falls below a predetermined level.

Though the example above has been given, for illustrative purposes, in connection with the spurious noises attendant upon the high-frequency components of the signals coming from a phonograph record, the invention is not limited to such use. The invention is of general applicability. It may be used to advantage to reduce the noise attendant upon the reproduction of practically any type of system involving recordings made upon wax, discs, tape, film, wires, etc. It may be used also to reduce various types of interference common in radio-broadcasting, such as adjacent-channel interference, frequently called "monkey-chatter," heterodyne whistles, the effects of atmospheric and other disturbances, and in any other application where noise is a factor. It is equally useful at audio, video, and other frequency ranges.

The invention finds particular application where the characteristics of the receiving or detecting means are not constant, but vary from instant to instant in accordance with variations in the frequency or the amplitude of the signals. Music is an example of a non-constant signal, as it contains various frequency components at different amplitudes, varying widely from instant to instant. The human ear is an example of a receiver or detector the degree of perceptive response of which, far from being constant, varies in a complicated manner with variations in frequency and amplitude. The human eye and photographic emulsions are further examples of receiving or detecting means that exhibit similar variable characteristics.

In all such cases, it is desirable, at any instant, to include, in the frequency range of the transmitted or the received signals, those frequency components only that are necessary for satisfactory transmission or reception in the particular frequency ranges, and to exclude those frequency ranges that would introduce a high noise level. Those frequencies only need to be included that are present at sufficient amplitudes to be detectable by the ear or other detecting or receiving means. The present invention takes advantage of the characteristics of the ear to eliminate noise by eliminating the response under conditions where the ear response is weak. It also takes advantage of the characteristics of the types of signal most generally encountered by eliminating the response to frequency ranges that are not likely to contain important signal energy.

Prior-art systems have been subject to the further defect that, even when the noise levels, after adjustment for best possible noise reduction, were not sufficiently high to cause difficulty, the quality of the reproduction changed noticeably as a function of the level of the signal. In some systems, for example, a variable-filter network has been employed, comprising either a resistance and a variable-reactance tube or a fixed reactance and a variable-resistance tube. Such systems provide, at best, only a relatively gradual type of cut-off characteristic, thus affecting frequencies within the audible range, as well as those above.

Most noise, moreover, and, in particular, random noise, such as is caused by tube hiss, shot effect, record scratch, etc., tends to be distributed, so that substantially equal energy is contained in equal-frequency bands. With noises of this character, the gradual reduction in high-frequency response obtainable with these prior-art systems must, by its very nature, produce serious modification of the high-frequency tones within the range of audibility, if it is also to produce appreciable reduction in noise level.

A further object of the invention, therefore, is not only to control the relatively-high-frequency components of the signals in accordance with the levels of the relatively-low-frequency components, but also to provide that the control shall be an optimum for the purposes of interference reduction.

Another object is to obtain maximum reduction of the spurious high-frequency noises with minimum effect upon the quality of the reproduction of the musical tones.

Toward the attainment of these ends, a feature of the invention resides in the employment of a special type of variable filter having a very sharp high-frequency cut-off; and, according to a further feature of the invention, suppression of the spurious-noise interference may be effected by varying the cut-off frequency in accordance with the characteristics of the signals.

Prior proposals for eliminating interference have been subject also to further objections not necessary to relate at length. Among them, for example, is the objection that they seriously affect the reproduction of sudden, loud, transient sounds, such as occur to a varying degree in all types of music and speech. This defect is generally caused by the slowness of operation of the control circuits, or by spurious components introduced by the control operation.

For satisfactory noise reduction, it is essential that the system operate with such rapidity that transient sounds such as cymbals be reproduced properly so that the background noise shall not be heard between musical phrases or between individual notes in a musical phrase. Such control action must not introduce spurious noises or undesirable effects.

A further object of the invention, therefore, is to provide a novel method of and means for controlling the frequency response of the system in a particular manner and with extreme rapidity, thereby to improve the reproduction of transients.

Still another object of the invention is to reduce the high-frequency components of certain types of signals in accordance with particular characteristics of the signals.

The low frequencies are not suppressed or altered in the process of eliminating the high-frequency components of the signals at the low-volume levels. Though thus effectively eliminating the spurious noise, therefore, the elimination of the high-frequency components may, under some conditions, if audible components are in any way affected, result in a loss of apparent brilliance of the reproduced signal, and in a loss of balance or symmetry between the high-frequency and the low-frequency responses.

This may be understood by considering, for example, audio-frequency music signals, the relative balance of which is referred to as aural balance. Aural balance may be defined as the ratio of the audible energy in the treble notes to the audible energy in the bass notes; or the ratio of the reproduced high and low frequencies. Those components only of the energy are taken into account, in this ratio, as are of such frequency and amplitude as to correspond to audible tones at the particular levels at which they exist.

Another object of the present invention, therefore, is to provide a novel method of and system for maintaining a substantially constant balanced relationship between the volume levels of the high and the low frequencies.

Another object of the invention is to provide a novel method of and system for maintaining a substantially constant apparent frequency range in reproduced music and other applications, though actually restricting the range under conditions where noise would be troublesome.

This is especially desirable in practical systems involving the reproduction of music where a change in the balance may be objectionable, particularly if the modification seems to vary with the volume level of the sound. The aural balance between the energy in the treble notes and the energy in the bass notes obtained in accordance with the present invention yields a high degree of apparent fidelity such as to satisfy the ear, even under conditions where frequencies within the audible range for the particular level to be reproduced are attenuated to a degree that would otherwise be noticeable. This allows greater suppression of noise with less noticeable effect upon musical quality than in prior-art systems.

To the attainment of the above ends, a further and important feature of the invention resides in the introduction of a predetermined amount of resonance into the response of the system when the range is restricted. The reproduction of transients, as judged by the ear, tends also to be improved.

The maintenance of constant aural balance so greatly improves the operation that, in general, the only noticeable effect of the use of the noise-suppressing system is the desired effect, namely, the suppression of noise. It also increases the flexibility of the system with regard to the type of signal, listening conditions, etc.

The desired end may be attained, in accordance with another feature of the invention, by suitably varying the characteristics of the transmission or filtering means.

The problem of maintaining balance has also been solved in a different manner by reducing the very low frequencies when the high frequencies are reduced. Both methods may be employed in combination.

Prior-art systems also have a tendency to be critical with respect to the type of signal, the character of the noise, the listening conditions, and other variables. This is very undesirable where the equipment is to be manufactured for general sale, to operate under a wide variety of conditions.

A further object of the present invention, therefore, is to provide the system with a degree of flexibility sufficiently marked to reduce the tendency toward critical operation.

With these ends in view, a feature of the invention resides in controlling the shape of the cut-off characteristic and the resonance effects of the filter in the neighborhood of the cut-off frequency so as to minimize the reduction of the apparent-high-frequency response of the system, as reflected in the reproduction of transients and in the brilliance or brightness of the reproduction, even for types of signals or listening conditions that do not coincide exactly with the particular types of signals, or the particular conditions for which the system is primarily designed to have optimum characteristics. The apparent-frequency range is thus maintained substantially constant under varying conditions, and for various signals.

Other and further objects will be explained hereinafter, and will be more particularly pointed out in the appended claims.

Figure 2:
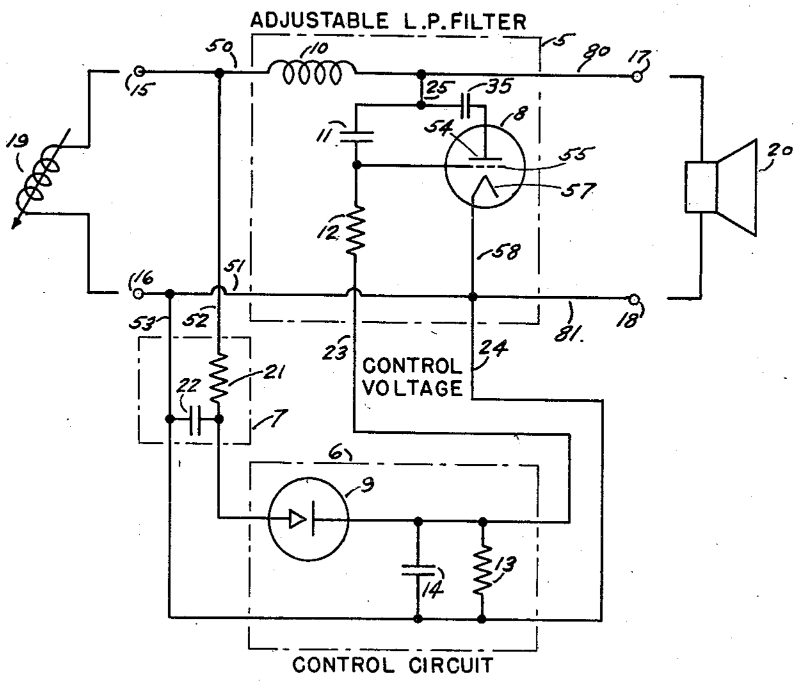
Figure 3:
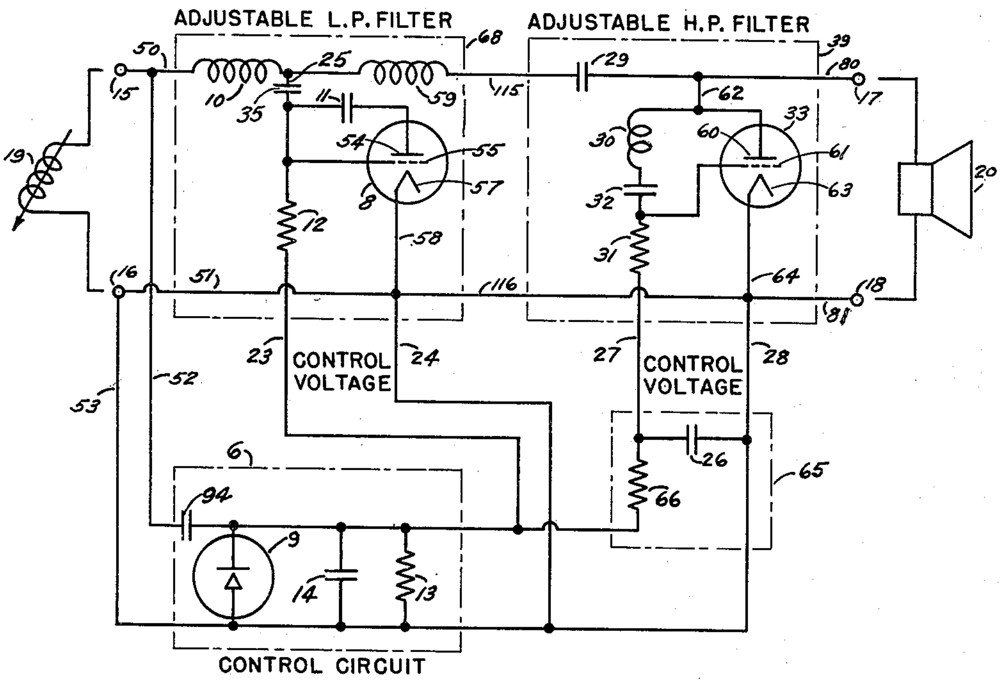
Figure 4:
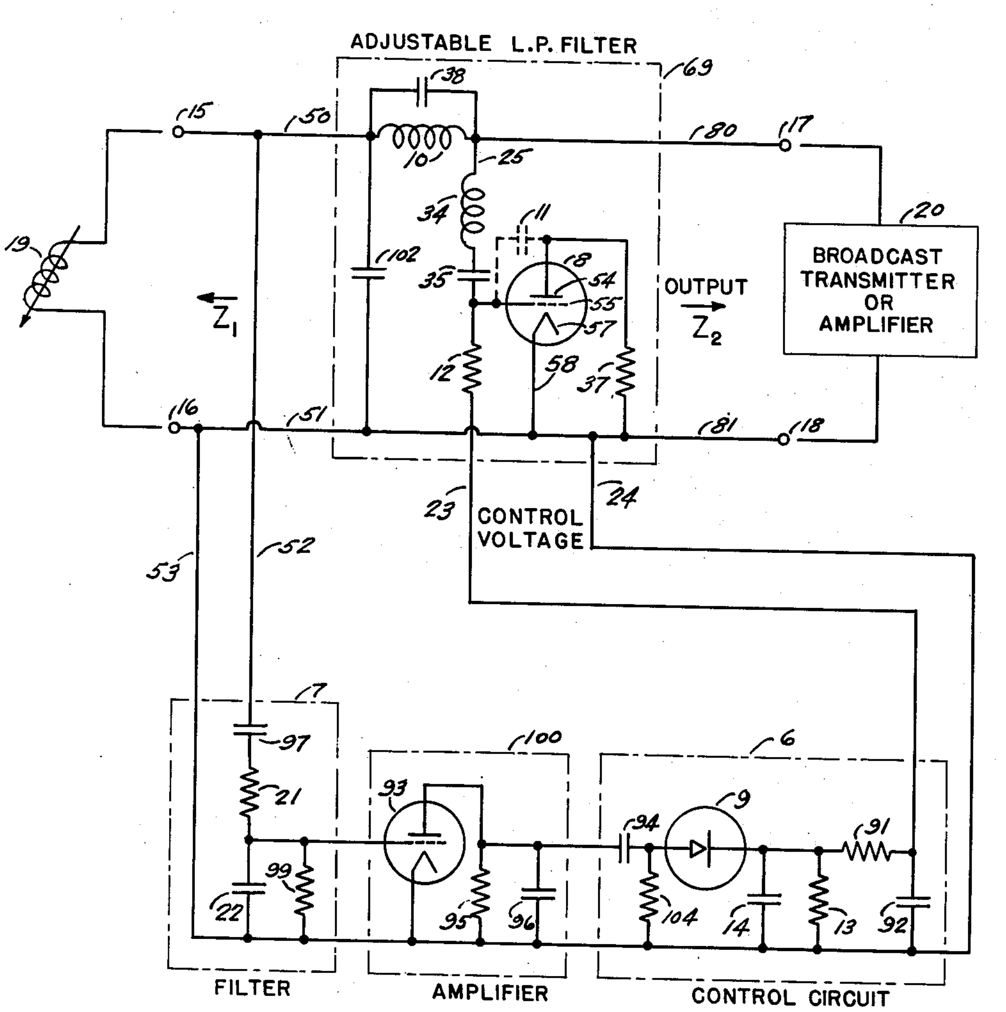
Figure 5:
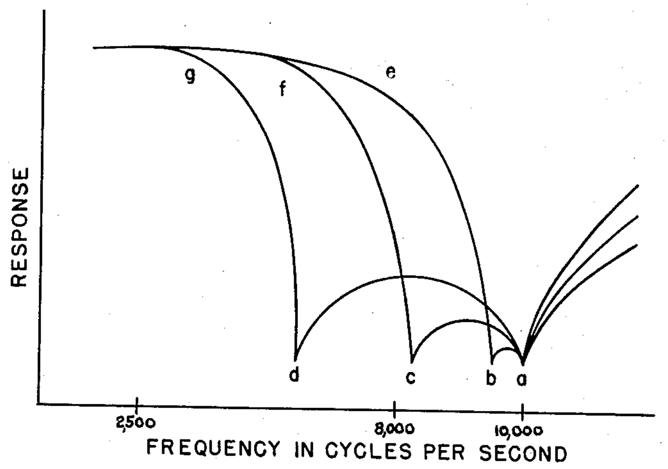
Figure 6:
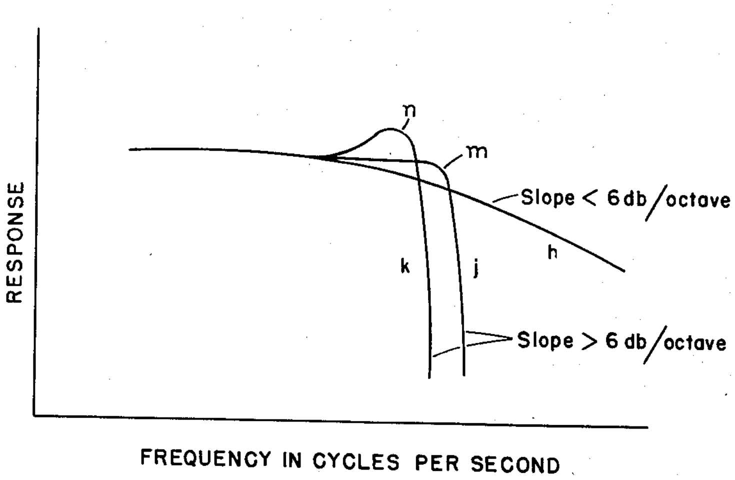
Figure 7:
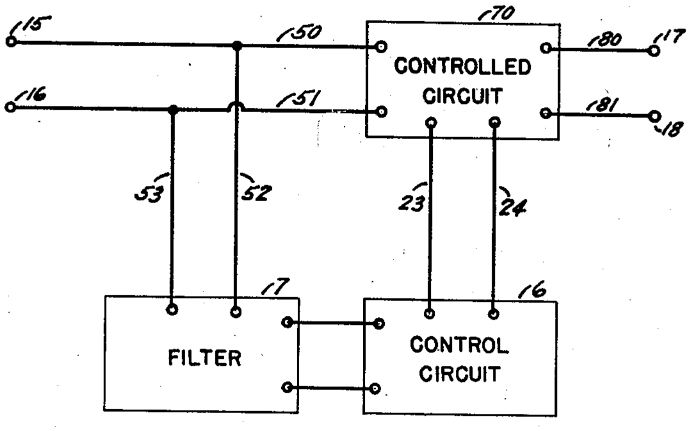
Figure 8:
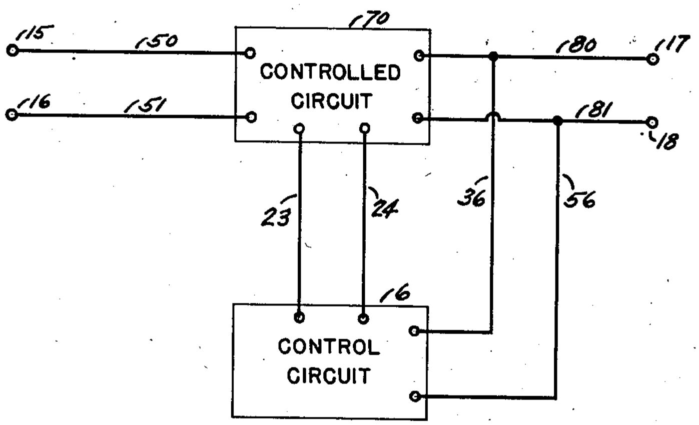
Figure 9:
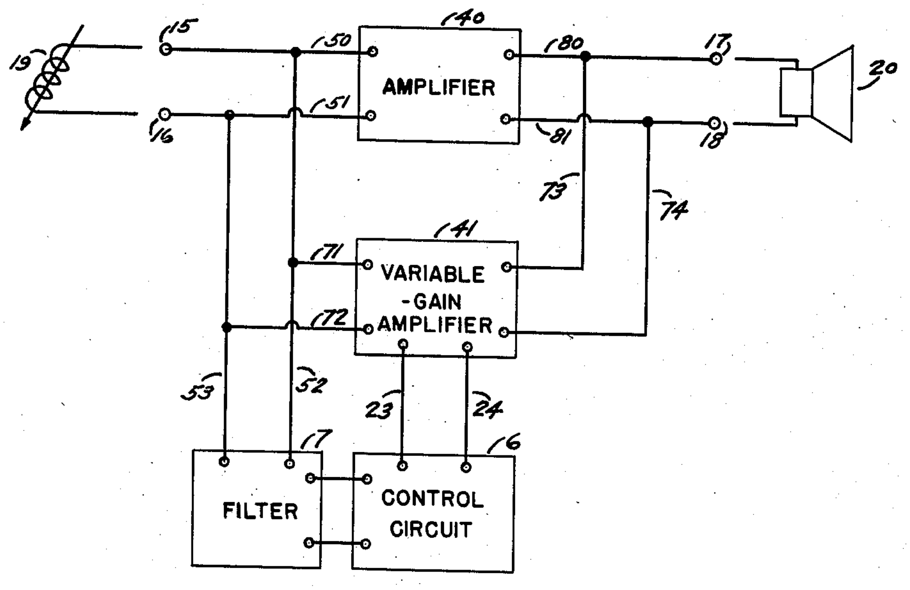
Figure 10:
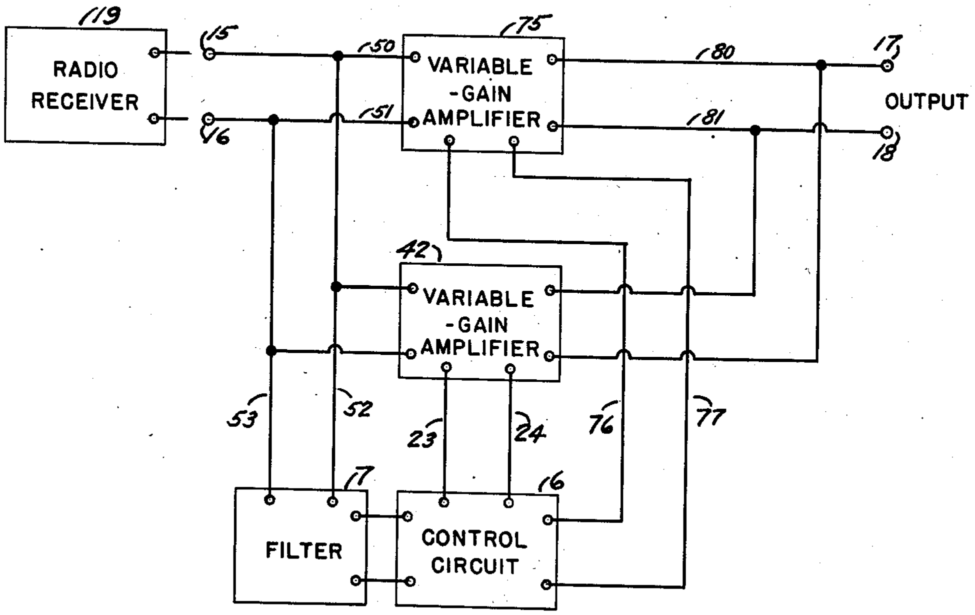
Figure 11:
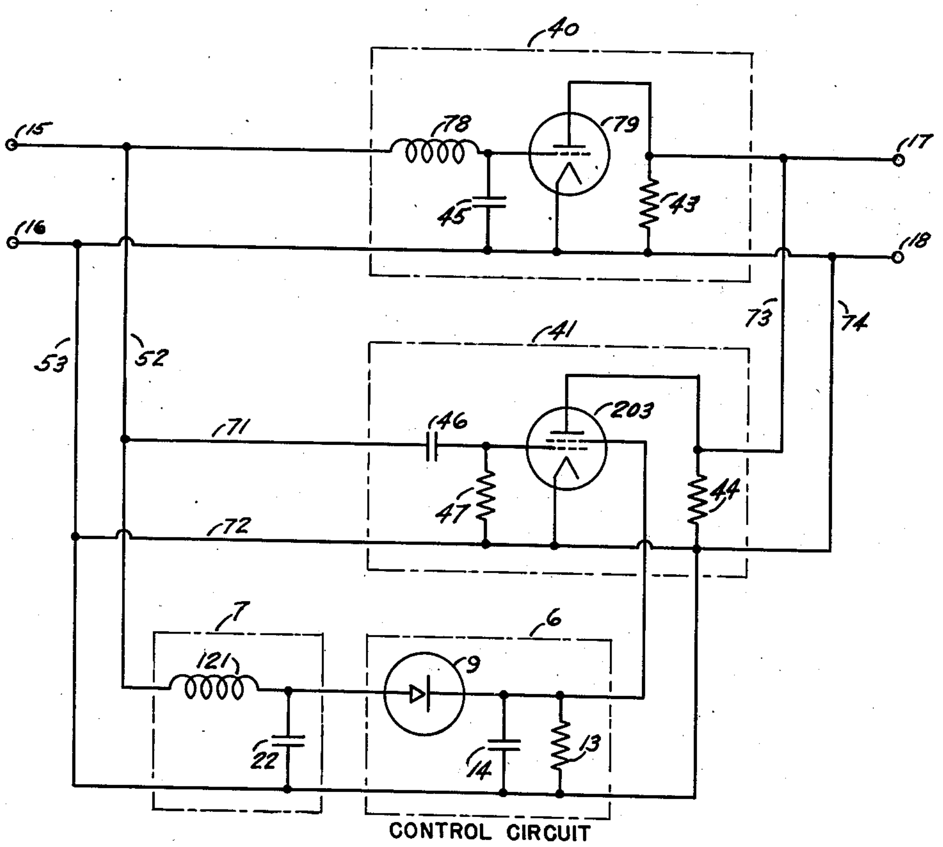
Figure 12:
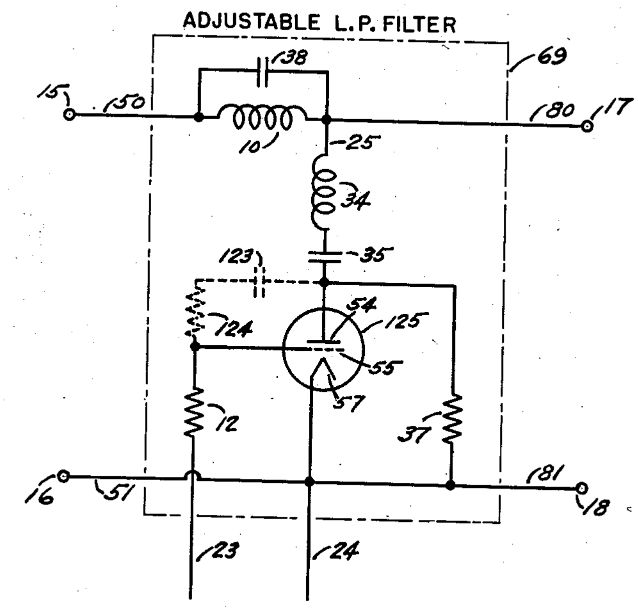
Figure 13:
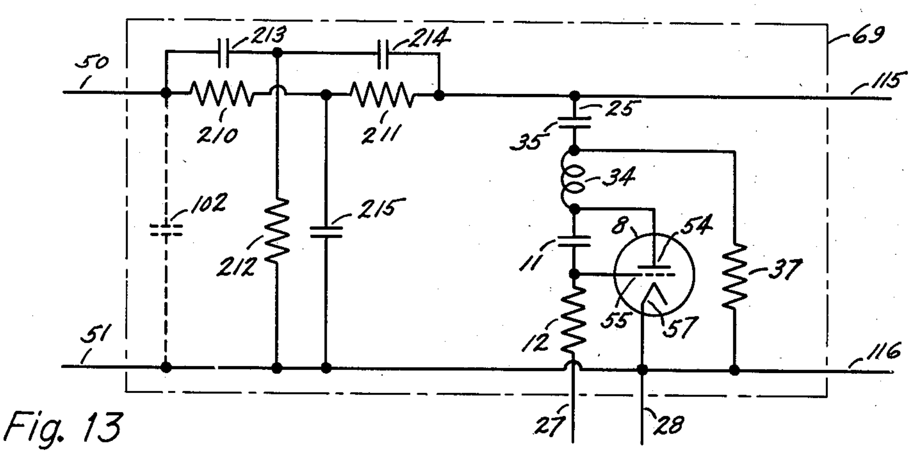
Figure 14:
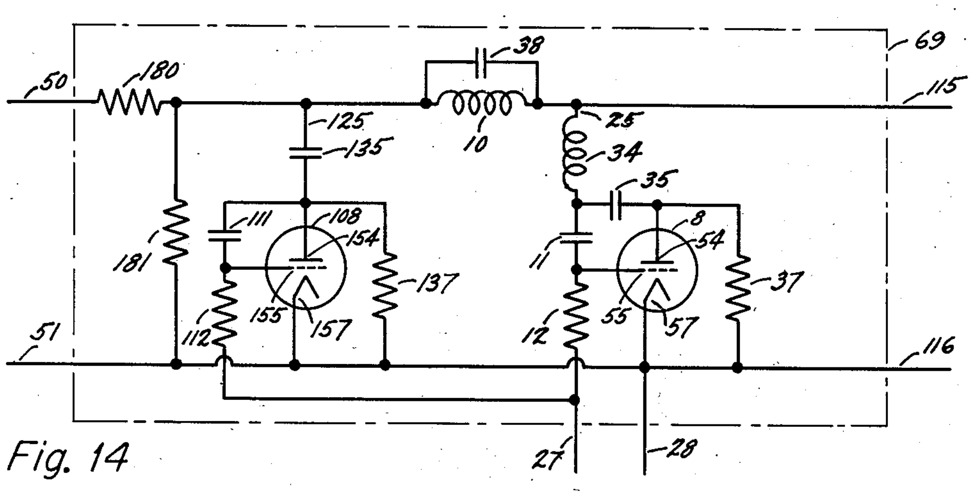
Figure 15:
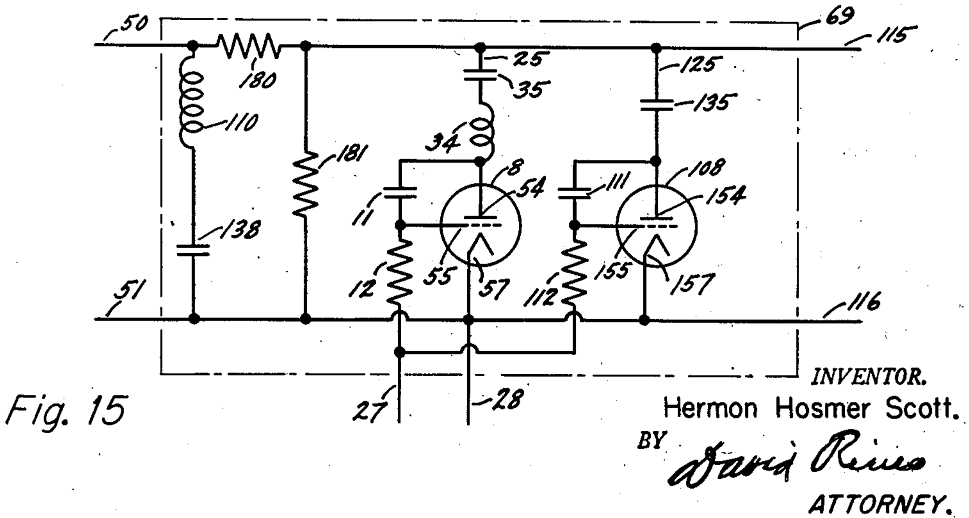

The invention will now be more fully explained in connection with the accompanying drawings, in which Fig. 1 presents a series of graphs representing the frequency-response characteristics of the human ear, and the relative amplitudes and frequencies of the various components present in a typical signal, such as orchestral music, the abscissae being plotted logarithmically in terms of cycles-per-second frequency, and the ordinates being plotted arithmetically in terms of decibel intensity units; Fig. 2 is a diagrammatic view of circuits and apparatus illustrating an embodiment of the invention employing but a single adjustable low-pass wave filter; Fig. 3 is a similar view illustrating another embodiment of the invention employing two adjustable filters, one high-pass, thus combining the principles of the present invention with a system for controlling the very low frequencies; Fig. 4 is a view similar to Fig. 2 of a modification; Figs. 5 and 6 present explanatory diagrams of typical frequency-response curves, with the abscissae, as in the case of Fig. 1, plotted logarithmically, in terms of cycles-per-second frequency, and with the ordinates plotted arithmetically, in terms of decibels-units response; Fig. 7 is a block-diagram view representative of the circuits and apparatus of Figs. 2, 3, 4, 9, 10, 11, and 12; Fig. 8 is a similar view of a modification; Fig. 9 is a similar view limited to circuits employing variable amplifiers; Fig. 10 is a view similar to Fig. 9 of a modification; Fig. 11 is a view similar to Fig. 2, with typical circuit configurations, but embodied in the block-diagram arrangement of Fig. 9; Fig. 12 is a fragmentary view similar to Fig. 4, showing a typical alternate means for controlling a filter by means of a vacuum tube; Fig. 13 is a view showing an alternate electric filter which may be used in the systems of Figs. 2, 3 and 4, and comprising a parallel-T network; and Figs. 14 and 15 show further alternate filters comprising two reactance tubes.

Though the method and system described herein are applicable wherever the degree of perception of the signal-receiving means varies with the characteristics of the signal, and wherein balance is important, the invention, for concreteness, will be explained as it applies to a typical application, namely, the reproduction of music and similar signals by a phonograph or a radio.

From the curve 1 of Fig. 1, representing the threshold of hearing-sensitivity for an ordinary human ear, it appears that the ear is most sensitive in the region around 2,000 cycles, and that the sensitivity falls off rapidly at both lower and higher frequencies.

The curve 2 may be considered to be representative of the energy-distribution characteristics, as a function of frequency, of typical orchestral music at a particular level. When shifted along the axis of ordinates, to correspond to changes in the volume or intensity of the sound, as in response to a volume control or an attenuator, it intersects the threshold curve 1 at points representing different frequencies. These points represent the limits of the frequency range necessary to reproduce satisfactorily for the listener the particular types of signal at the particular volume or intensity levels. If the level of the curve 2 is reduced equally throughout the range, for instance, to occupy the position of the curve 3, the necessary or perceptible range of frequencies is seen to become accordingly restricted, from about 70 cycles to about 250 cycles at the low-frequency portions of the curves 2 and 3, respectively, and from about 12,000 cycles to about 4,000 cycles at the high-frequency portions of the curve 3. If the music or other signal should have frequency components outside these ranges, they would not be audible.

Most musical instruments, when played softly, moreover, produce a mellower tone than when played loudly, thus indicating the presence of fewer harmonics or overtones falling within the higher-frequency ranges. While the curve 2, as before stated, may become transformed into the curve 3 when the sensitivity of the transmission means is reduced, therefore, it may actually become transformed into the still lower curve 4 if the reduction of volume or intensity is caused by the orchestra playing more softly. The lower curve 4 shows that the before-mentioned low-level limit of 4,000 cycles may thus become reduced to about 2,500 cycles or less when the orchestra is playing softly; the greater portion of the audible energy is below this 2,500-cycle value. Since most music, by its very nature, covers an appreciable volume or intensity range, this characteristic offers the further advantageous feature, therefore, that it allows further restriction of the frequency range of the transmission equipment at low-volume or low-intensity levels, from about 4,000 cycles to about 2,500 cycles, without seriously impairing the quality, as perceived by the ear. A similar situation exists for speech and vocal music.

The suppression of noise according to the present invention is based upon these and similar factors.

The curves 2 and 4 may, therefore, be regarded as representative of typical signals involving high and low volume or intensity levels, such as may be encountered in the reproduction of music and similar signals, the curve 2 being at an average volume or intensity level of, say, 63 decibels in the region around 1,000 to 2,000 cycles, which contributes most to the loudness as heard by the ear, and the curve 4 at a volume or intensity level of approximately 18 decibels in the same range. The points where the curves 2 and 4 cross the curve 1, at 70 and 12,000 cycles for the curve 2, and 250 and 2,500 cycles for the curve 4, respectively, represent the ranges necessary to reproduce these particular signals satisfactorily at these levels.

When the orchestra plays loudly, it is desirable to reproduce, in so far as the rest of the system is capable of so doing, the entire range of high and low frequencies up to about 12,000 cycles; otherwise, the reproduction will fail to include some of the audible components of the music signal represented by the curve 2. When the orchestra plays softly, however, the low-frequency range up to about 2,500 cycles is all that is needed, as demonstrated by the curve 4; all the frequencies above about 2,500 cycles may then be eliminated without any serious effect upon the reproduced music. At intermediate levels, of course, intermediate ranges are required.

If the system, through other limitations, is not able to reproduce satisfactorily the entire range up to 12,000 cycles, it may be possible to restrict the high-frequency range to a limit considerably lower than 2,500 cycles, at low levels, without further noticeably impairing the quality of reproduction as compared with high levels.

If the type of signal differs appreciably from that represented by the curves 2 and 4, however, if the listener's acuity of hearing differs from that represented by the curve 1, or if the level of reproduction is increased, some of the frequencies that are attenuated may lie within the range perceptible to the listener.

If the transmitted range of the music is less than the range of the components that would be perceived by the ear, an unnaturally low-pitched or high-pitched quality would be imparted to the music, depending upon whether the reproduced signal is most deficient in the high or the low frequencies, respectively. It is desirable, therefore, not merely to reduce noise and other components lying in certain frequency ranges, but also to accomplish the reduction in such a way as to minimize any resulting change of balance that might be perceived by the ear under conditions varying from the exact conditions as typified by the curves of Fig. 1.

As before indicated, one of the objects of the present invention is to maintain the apparent quality of reproduction approximately constant, even though the signal and other conditions should vary somewhat from those represented by the curves of Fig. 1.

For signals of the character described, however, even when a wide range can be reproduced, there is no advantage whatever in reproducing the very-high-frequency ranges that are above the threshold of hearing, represented by the points where the signal curves, such as the curves 2 and 4, intersect the curve 1, representing the sensitivity characteristics of the ear. When reproducing the signals represented by the curve 4, as an illustration, no frequencies in the high-frequency ranges, say, above about 2,500 cycles, are necessary. As the level increases, however, higher frequencies are required for completely faithful reproduction until, when the curve 2 is reached, frequencies up to 12,000 cycles are so required. This extreme upper limit may be determined by other considerations, such as the recorder, the loudspeaker, and other parts of the system.

When one listens to phonograph records of orchestral music, however, the background-noise level is greatly affected by a change in the high-frequency cut-off from some high value, such as 12,000 cycles, to a low value, such as 2,500 cycles. This alone indicates that the noise is at such a level as to be considerably above the threshold of hearing, and considerably above the amplitude of many of the high-frequency components in the music. It is hence undesirable to control the response of the system in this high-frequency region by the amplitude of the high-frequency components in the signals, as has been proposed in many prior-art systems, since these components will frequently be constituted mostly of noise, which it is desired to suppress, and the higher-level noise components may be considerably louder than the lower-level high-frequency components of the music.

According to a feature of the present invention, therefore, advantage is taken of the fact that the high-frequency range, above about 2,500 cycles, consists mainly of harmonics or overtones that are always accompanied by lower-frequency components consisting of fundamentals that are generally of higher amplitudes than the high-frequency components. Such fundamentals as occur in this extremely-high-frequency region above 2,500 cycles, approximately three octaves above middle C and higher, occur only occasionally in music, and are then almost always accompanied by lower-frequency fundamentals. The response of the system to the high-frequency components is therefore preferably controlled, according to a feature of the present invention, in accordance with levels of the signal energy present in the lower-frequency components, say, below about 2,500 cycles. Not only are the loud spurious noises, involving the high frequencies only, not reproduced at the low-intensity levels of the sound, but the frequency characteristics of the sensitivity of the control means may be made to approximate those of the human ear, with the result that the system responds only to the high frequencies under conditions where there is sufficient lower-frequency energy in the signal to mask the noise. It is known that the greatest masking effect occurs, in the human ear, for frequencies below the high-frequency range under discussion. There is no need for control by the very-low-frequency range, as below 250 cycles, where the ear again becomes relatively insensitive.

The range of frequencies referred to as "low" in this specification, when referring to music signals, and as illustrated typically by frequencies below 2,500, includes those ranges referred to as "medium" and "low" or "medium" and "bass" when considering the bass tones of the music, as in connection with tone-control systems. In this specification, the so-called "bass" tones of the music are considered as "very low."

Referring now to Fig. 7, when an input signal, as from a phonograph pick-up, a radio-receiver, or another source 19, of impedance $Z_1$, is applied to the input terminals 15 and 16, it is transmitted, by input-lead conductors 50 and 51, through a controlled circuit 70, and by way of output-lead conductors 80 and 81, to the output terminals 17 and 18. These may be connected to any output load 20, of impedance $Z_2$, such as a loudspeaker, an amplifier, or a radio transmitter.

The controlled circuit 70 may, for example, be the wave filter 5 shown in Fig. 2, or 69 shown in Figs. 4 and 12, the wave filters 68 and 39 of Fig. 3, the amplifiers 40 and 41 of Figs. 9 and 11, or the amplifiers 75 and 42 of Fig. 10. The transmission paths provided by the amplifiers 40 and 41 of Figs. 9 and 11, and the ampliers 75 and 42 of Fig. 10 are respectively connected in parallel.

The controlled circuit 70 may be designed to pass normally only a restricted range of frequencies at low-volume levels. This may be expanded to the full range that it is desirable to transmit at high-volume levels; say, from about 70 to about 12,000 cycles, or from about 90 to about 8,000 or more cycles, or any other range, depending upon the application and the limitations of associated equipment. The controlled circuit 70 may also be designed so that it shall be able to attenuate or completely suppress, at low-volume levels, in predetermined ratio, the higher range of frequencies; say, the high-frequency components above about 2,500 cycles, or some similar value, depending upon the application and other factors.

Referring to the practical circuit illustrating the circuit of Fig. 7 that is shown in Fig. 2, the adjustable low-pass wave filter 5 may be controlled in accordance with the level of the input signals to reduce the high-frequency components of the input signal at, say, above about 2,500 cycles. This control may take place, in accordance with a feature of the present invention, at low-volume levels of the low frequencies of the input signal; say, below about 2,500 cycles. Within the term "low-volume levels," of course, is included levels of zero volume. The pick-up 19 and the load 20 are shown symbolically as typical source and load, and may be provided with amplification and the like, where necessary.

The wave filter 5 is essentially a low-pass half-section comprising a series arm, shown comprising an inductance 10, connected in the input lead 50, and a shunt arm comprising a variable simulated shunt capacitance connected across the output leads 80 and 81. The variable shunt capacitance comprises a capacitive reactance tube 8, provided with a feed-back network comprising a condenser 11 connected between its anode or plate 54 and its control-grid electrode 55. The reason why the reactance tube 8 functions as a capacitance will be explained presently. The anode 4 and the condenser 11 are connected in parallel to the output lead 80 by a lead conductor 25, and the cathode 57 of the tube 8 is connected to the input lead 51 and the output lead 81 by a conductor 58. As hereinafter more fully described in connection with Fig. 4, a parallel-connected condenser 102 may form, with the other circuit elements, a complete $\pi$-section filter, thus to increase the attenuation at high frequencies.

The series inductance 10 and the simulated variable capacitance of the reactance tube 8 shown in Fig. 2 form, in effect, a low-pass constant-$k$ filter yielding substantially no attenuation within the low-frequency band, and a high degree of attenuation outside of that band, in the high-frequency range. As with filters utilizing conventional inductors and capacitors, this attenuation is effected by introducing out-of-phase components as a result of the phase shifts in the circuit elements. These out-of-phase components tend to cancel. This will tend to prevent the high-frequency components of the signal voltage at the input terminals 15 and 16 from appearing at the output terminals 17 and 18. This is distinguished from prior-art circuits which have only a gradually-changing loss characteristic and that must, by their very nature, cause serious attenuation within a desired band in order to roduce noticeable noise suppression above that band.

The attenuation or suppression is under the control of a control circuit 6. The control circuit 6 is of such nature as to produce no noticeable effect upon the quality of the reproduction. The input side of the control circuit 6 is subjected to the action of the input signal from the signal source 19 through the medium of lead conductors 52 and 53 respectively connected to the input leads 50 and 51. The control circuit 6 is designed so as automatically to shift the response range of the controlled circuit 70.

The output of the control circuit 6 is connected, by a conductor 24, to the cathode 57 and, by a conductor 23, through a resistor 12, to the control grid 55. The resistor 12 thus transmits bias voltages from the control circuit 6 to the grid 55. The grid bias thus developed in the system of the control circuit 6 is therefore transmitted by the leads 23 and 24 to the adjustable filter to impress an adjustable control voltage from the output of the control circuit 6 upon the grid 55. The reactance tube 8 is thus controlled to vary the cut-off of the filter. A more elaborate arrangement which may be substituted will be later described in connection with Fig. 4.

The capacitance 11, the resistance 12 and the other elements are so connected as to provide a feed-back network between the plate or output and the grid or input circuits of the reactance tube 8. This feed-back introduces a phase lead of approximately 90° between the plate voltage and the grid voltage of the reactance tube 8, at high frequencies. The plate or output circuit of the tube 8, with its associated circuits, therefore, as before stated, functions as a capacitance. Equivalent circuits for effecting this result may, of course, be used. The magnitude of this simulated capacitance of the reactance tube 8 is a function of the transconductance of the tube 8 and this, in turn, is a function of the electrode voltages.

The adjustments are such that the control circuit 6 automatically adjusts the cut-off frequency of the filter 5 so as to attenuate all frequency components of the input signal above a predetermined value, such as 2,500 cycles, at low-volume or low-intensity levels of the signal, or predetermined ranges of the signal. The spurious noises accompanying the high-frequency components are thus eliminated at low-volume levels with a minimum effect upon the tone quality. The system thus adjusts itself automatically to the signal to be transmitted.

Any vacuum tube, such as the tube 8, moreover, may contain more than one control electrode and, as is well known in the art, separate control electrodes may be used for the adjustable bias and the feed-back. Depending upon the normal ratio of signal levels and biases which may be used with practical tubes, moreover, it may be desirable to add attenuation to the circuit, as in the leads 50 and 51, or gain to the circuit, as in the leads 52 and 53, to provide best operating conditions for the vacuum tube.

Most treble tones, or high musical fundamentals, lie below the typical high cut-off frequency of about 2,500 cycles, and are of relatively low frequency compared to the relatively high frequencies that are attenuated in accordance with the present invention. For the larger part, the relatively-high frequencies that are attenuated in accordance with the present invention are the harmonics or overtones of these treble fundamentals plus a few extremely high treble fundamentals constituting a small portion only of the total energy in the music.

The characteristics of the control circuit 6 should be so selected for each range as to insure the best performance with the intended type of signal.

A filter network 7 may be inserted in the lead conductors 52 and 53, in the input circuit of the control circuit 6, to vary the response of the control circuit 6 with frequency. The function of the filter 7 is to prevent the control circuit 6 from operating on signals in the eliminated range of frequencies, and may approximate to the sensitivity characteristics of the ear. This is necessary when the applied signal may have strong high-frequency noise components occurring at levels higher than the desired components. An amplifier 100 may also be inserted in these leads 52 and 53 to increase the magnitude or the effectiveness of the control voltage, and to provide optimum control characteristics.

The control circuit 6, which controls the transmission of the filter 5, is thus actuated by signals obtained through the filter 7. A purpose of this and similar filters is to reduce the sensitivity of the control means in the frequency ranges being controlled, thus to prevent the transmission of high-level noise in those ranges.

The control circuit 6 is shown in Fig. 2 as comprising a series rectifier 9 for rectifying the signal, connected in the control-circuit-input lead 52, and a condenser 14 connected across the control-circuit-input leads 52 and 53. The condenser 14, which bypasses signal voltages between the conductors 23 and 24, may be located in associated circuits. The resistance of the rectifier 9 and the capacitance of the condenser 14 provide an R-C filter circuit for reducing the high-frequency components of the rectified signal voltage. A leak resistor 13 is connected in parallel with the capacitance 14. The rectified voltage of the control circuit varies in accordance with the amplitude of the signal applied to the input terminals 15 and 16.

The time constants of the rectifier 9 and the condenser 14 should be so chosen as to allow for rapid expansion of the high-frequency range without introducing spurious noises into the output circuit. The resistance of the leak resistor 13, on the other hand, should be relatively high in value, so that the response of the system shall not contract suddenly, and thus accentuate vibrato or other musical effects. The system should contract at approximately the same rate as the decay of reverberation in normal music, or, when the noise level is high, at a faster rate. Proper selection of the time constants and novel features of the controlled circuits allow the operation of the system to follow rapidly individual notes or phrases in music, thus providing a high degree of noise suppression with no substantial effect upon the quality of musical sounds including transients. As a practial matter, it is possible to use time constants of such value that the system range will expand satisfactorily for musical transients, but will not open on single loud clicks, as from a cracked record or static. The condenser 35 is also of importance when the circuit must be controlled rapidly, as will be later explained.

In the case of signals such as those depicted by the curves 2 and 4, where the volume level is always greatest in a range not being controlled, the control will still reside with the signal, rather than with the spurious noise, even though the filter 7 be not employed, providing that the spurious noise is always at a lower level than lower-frequency components of the desired signal. When signals in the lower ranges are present, therefore, the control circuit 6 functions to increase the range of the controlled circuit 70, thus permitting of transmission over a wide frequency range.

As illustrated in Fig. 8, however, a result similar to that obtained with the aid of the filter 7 may be obtained without employing the filter 7. The leads 52 and 53 are shown in Fig. 8 connected to to output terminals 17 and 18, as indicated by the leads 36 and 56. The control voltage is then derived, not from the input, but from the output voltage of the system, under the control of the output signal, at the output level. The terminals 15 and 16 may represent the input and the terminals 17 and 18 the output, or vice versa.

If the leads 36 and 56 are thus connected to the output terminals 17 and 18, so as to effect control from the output circuit, and if the control circuit 6 is sensitive to high frequencies, the transmission of the high frequencies will not be reduced until the level of the high frequencies, as well as of the low frequencies, becomes decreased. The transmission of the high frequencies cannot then, however, be increased by an increase in the level of the high frequencies. It can be increased only by an increase in the level of the low frequencies. While this operation is not identical with control by the input circuit, through the filter 7, it is satisfactory in many applications, and allows of eliminating the filter 7, thus saving parts and cost. It still has the advantage that the frequency range is not increased by high-level high-frequency noise. With control from the output circuit, and without employing the filter 7, the frequency range of the system can expand only when the low frequencies increase, but will contract only when all the frequencies decrease. The addition of the filter 7 to the system of Fig. 8 in the leads 59 and 60 would give operation similar to that of the system of Fig. 7.

At normal signal levels in the lower-frequency ranges, for the type of signal depicted by the curves 2 and 4, the filter 7, in the system of Figs. 2, 3, and 4, is unnecessary to insure that the main control shall be exercised by the lower frequencies, providing that any high-frequency-noise components that may be encountered are not so strong as the lower-frequency components in the signal. The filter 7 may be eliminated in the systems of Figs. 2, 3, and 4 also if the input signal is of such character that frequencies within the controlled range are normally at a relatively low level, so that the main control is by other frequency ranges.

Where a considerable degree of noise suppression is required, with a minimum effect upon the audible quality, there should be substantially no attenuation within the range of frequencies perceived by the ear, and the attenuation beyond the highest perceptible frequency should be as great as possible. The transmission-cut-off characteristics should therefore be as sharp as possible with apparatus that is economically practicable.

The conventional R-C or L-R tone control of a radio receiver may be rendered automatically controllable in response to volume level by means of reactance or variable-resistance tubes or other devices. The rate of increase of attenuation obtained with a circuit of this character, however, approaches six decibels per octave as a maximum, and the cut-off is very gradual, as represented by the curve *h* of Fig. 6. Because of this gradually-changing-loss characteristic applied to the high-frequency response, such operation is often unsatisfactory. By reason of its very nature, when adjusted to provide a reasonable degree of noise suppression, it changes noticeably the quality of the reproduced music at low-volume levels, reducing the brilliance or brightness by attenuating high-frequency tones within the range of the ear.

The gradual cut-off illustrated by the curve *h*, if it produces any appreciable attenuation of high frequency noise, will also produce, at audible frequencies, noticeable attenuation of the signal frequencies, thus causing a dull, lifeless character in the reproduced music. Such a circuit, when producing, for instance, an attenuation of 20 decibels at 8,000 cycles, which is a typical upper-frequency limit for phonograph records, would provide also an attenuation of the order of 8 or more decibels at 2,000 cycles, and 3 or more decibels at 1,000 cycles. The range from 1,000 to 2,000 cycles is where the normal ear is most sensitive, and it also contains a large amount of the sound energy in orchestral and other types of music, including both important fundamentals and overtones. With such a system, the reduction in noise will obviously be relatively small, and the effects upon the quality of reproduction of tone balance very noticeable.

Any reduction in response in this region, where the ear is most sensitive, is extremely noticeable and, as before explained, it definitely lowers the balance of the treble tones to the lower notes. This results in causing the previously-mentioned lack of brilliance or brightness, and an unnatural dullness or boomy quality in the reproduction.

Any attempt to improve the quality by decreasing the amount of noise suppression restores the difficulty of the presence of spurious noise. This is because, as before explained, when using an R-C, an L-R, or an equivalent circuit, the attenuation increases so very slowly with frequency.

Many noise phenomena, such as the scratch noise on phonograph records, tend to have equal amounts of energy in equal-band widths. For this reason, further to improve the apparent fidelity of a system of this type, an optimum reduction in noise, with the least impairment of musical quality, may be obtained with a sharp cut-off characteristic, as represented by the curves *j* and *k* of Fig. 6. The curve *j* demonstrates that a relatively sharp cut-off *m* may be obtained in a correctly designed reactance-type wave filter, such as is illustrated in Figs. 2, 3, and 4. The curve *k* represents a similar cut-off, but with a resonant peak *n*.

The curve *j* is characteristic of a reactance-type wave filter matched to theoretically correct load impedances, or otherwise connected to impedances having a certain amount of resistance or dissipation. The curve *k* is characteristic of a similar filter operating at impedances deviating from conventional matched values. It will later be pointed out that connecting a relatively low impedance across the input terminals 15 and 16 provides more rapid control of the filter. This tends also to produce a curve such as is indicated at *k*, instead of the curve *j*.

Resonance may be obtained, for instance, by operating a filter, like the filter 5 of Fig. 2, from a relatively low impedance 19. The resonance is further increased by operating the filter into a high impedance, as across the leads 80 and 81. The rate of increase of attenuation for both curves $j$ and $k$ is greater than six decibels per octave. These curves $j$ and $k$ also provide less apparent decrease in the high-frequency response, because of the sharp cut-off or the resonance.

The sharp cut-off of the curve $j$ reduces the balance of the music less than the gradual cut-off represented by the curve $h$. A resonant type of cut-off, as illustrated by the curve $k$, however, introduces a certain amount of resonance, which would generally be considered undesirable at high-signal levels, but which is not objectionable at low-signal levels, and tends to compensate for the loss of brilliance caused by attenuating the high frequencies, besides improving the reproduction of transients.

The curves $j$ and $k$, therefore, are preferable as cut-off-characteristic curves for the type of system described, not merely on the basis of greater suppression of noise, but also because they provide better apparent high-frequency response. In this type of system, the cut-off functions at low-signal levels only, and the high-frequency range expands as quickly as possible upon application of a higher signal level. Because any artificial brilliance caused by the cut-off characteristic is present only at low levels, and the cut-off or resonant frequency shifts rapidly upon application of a loud signal, a more realistic reproduction of transients is provided than in a system as typified by the curve $h$, even though the latter system does not provide so good noise suppression. The disclosed circuits therefore provide both better noise suppression and better apparent fidelity than prior-art devices having relatively gradual cut-off characteristics. The system of the present invention, furthermore, is less critical in regard to the type of signal, the listening level, the listener's acuity of hearing, and other variables usually encountered than prior-art systems.

If the same listener always heard the program over the same range of levels, and the orchestra always produced exactly the same sound spectrum, it would be a simple matter to determine what frequency ranges could be attenuated or suppressed, without affecting the quality noticeably. In any practical application, however, many variations prevail. The usual type of signal, for instance, does not remain constant. Any given signal may deviate from the characteristics represented by the curves 2 and 4, the listening conditions may be different, and an individual's hearing may vary from the average. All listeners, again, do not have equal acuity of hearing. The total sensitivity of the system, from microphone to loudspeaker, moreover, may be varied, or the volume range of the program may be contracted, thus changing the range of listening levels. These factors may result in a condition where, sometimes, the transmitted frequency range of the music is less than the range of the components that would be perceived by the ear. This would impart an unnaturally low-pitched or high-pitched quality to the music, depending upon whether the reproduced signal is most deficient in the high or the low frequencies, respectively. It is desirable, therefore, not merely to reduce noise and other components lying in certain frequency ranges, but also to accomplish the reduction in such a way as to minimize any resulting change of balance that might be perceived by the ear under conditions varying from the exact conditions as typified by the curves of Fig. 1.

For listening levels and music corresponding exactly to the levels depicted in Fig. 1, therefore, a sharp cut-off characteristic in the filter is all that is required to provide maximum reduction of noise with minimum effect upon musical quality. In practice, however, there is not usually any such sharp correspondence. The characteristics vary, and the listening conditions may also vary. Under certain circumstances, therefore, the cut-off frequency may be below the maximum frequency that can be heard by the ear at any particular level, with consequently noticeable reduction in the high-frequency response.

In accordance with a feature of the present invention, however, apparent constancy of aural balance between the energy in the treble notes and the energy in the bass notes may be maintained under such conditions by using a filter having a predetermined degree of resonance in the neighborhood of cut-off, or having resonant circuits operating below critical damping. By reason of this resonance or less-than-critical damping in the neighborhood of the cut-off frequency, an apparent intensification of the response is provided in the region of cut-off, through actually increasing either the amplitude of the components or the duration of transient components in this region, or through a combination of both effects. The net result is to compensate for any reduction in the apparent energy of the treble tones, as heard by the ear, in a manner alternative or supplemental to the possible reduction of the very low frequency components. The apparent balance between the treble and the bass notes in the music is maintained by increasing the energy in part of the treble range when the energy in a still higher portion of the treble range is reduced in order to reduce the noise.

The curve $k$ of Fig. 6, for example, shows, at $n$, a rise in response with respect to the curves $h$ and $j$, thus indicating an increase in amplitude for a particular range of frequencies. Both curves $j$ and $k$ exhibit, with respect to the curve $h$, sharp cut-off characteristics $m$ and $n$, indicative of a reactance-type filter that operates through the medium of resonance effects. These effects, if the circuit is less than critically damped, tend to increase the amplitude or the duration of transient sounds in the frequency range involved, thus increasing the stimulus to the ear and, in effect, intensifying, such transient sounds. The term "intensifying" may be employed, therefore, to designate increasing the amplitude, or lengthening the duration of, the signals, as through resonance, thus enhancing the effect of the signals in the particular frequency range.

The present invention, through the use of a filter 5 two or more of the arms of which may each have a reactive impedance, provides a sharp cut-off sufficiently steep so that the attenuation of the high-frequency components of the signals shall increase, above the high-frequency limit, at a rate greater than about six decibels per octave. At least one of the reactances or one of the arms is variable to vary the cut-off characteristics.

Because of the absence of moving mechanical parts in the filter 5 and the control circuit 6, it is possible so to design the circuits that the control shall occur at a high rate of speed, sufficient to follow rapidly the demands of the signal. The rapid control is effected without the introduction of noticeable spurious tones into the music arising out of the control function. This improves the reproduction of transients.

Aural balance is restored to a certain degree, therefore, by resonance in the filter, which intensifies the response just below the cut-off. Although this region is referred to as a low-frequency region, it is low only in comparison with the high frequencies that are reduced. Actually, as before explained, the higher frequencies in the relatively low-frequency band represent high treble tones up to three or more octaves above middle C. By accentuating these tones just below cut-off, compensation to a large degree is effected for attenuation of the higher frequencies.

The invention is shown in Fig. 3 embodied in a system for reducing not only the high-frequency components, but also the very-low-frequency components, for reducing low-frequency noises, or for maintaining aural balance by alternative or supplemental means. This is a very useful combination. The simple filter 5 of Fig. 2 is replaced by two filter 68 and 39: the former, low-pass, for reducing the high-frequency components, as above 2,500 cycles, as in the system of Fig. 2; and the latter, high-pass, for reducing the very low-frequency components, as below 250 cycles. The practical advantage of this is that the low-pass filter 68 that attenuates the higher frequencies, as will be more fully described hereinafter, may be made to function much more rapidly than the high-pass filter 39, which controls the lower frequencies, without introducing noticeable spurious components into the signal in the output of the system as the result of the control operation. This improves the reproduction of transients.

The output conductors 115 and 116 of the low-pass filter 68 lead to the input of the high-pass filter 39, and the output of the high-pass filter 39 is connected by the output conductors 80 and 81 to the output terminals 17 and 18.

The input connections of the low-pass filter 68 are similar to those of the low-pass filter 5 of Fig. 2. The output connections of the control circuit 6 to the low-pass filter 68 are also substantially the same as in the system of Fig. 2. The connections of the reactance tube 8 of the low-pass filter 68, however, are of a somewhat different type from those in Fig. 2, embodying the so-called "Miller effect."

The lead conductor 25 is connected directly to the grid 55 and not, as in the system of Fig. 2, through the condenser 11. The input capacitance of the tube 8 which, in accordance with the Miller effect, is a function of the transconductance of the tube 8 is, in this case, increased by the addition of the capacity of the grid-plate-connected condenser 11. The capacitor 11 increases the grid-plate capacitance of the tube 8, thus providing a larger variable capacitance than would be obtained merely by using the internal capacitance of the tube itself. The simulated capacitance is varied, as in the system of Fig. 2, by varying the grid bias.

The presence of an additional inductance 59 between the conductor 25 and the lead conductor 115 converts the filter 68 into a full T section. This is shown merely for the sake of variety, and to illustrate another of the many possible filter configurations. The filters 68 and 39 may be reversed in position, or the input and output circuits interchanged.

The input connections of the control circuit 6 of Fig. 3 are shown substantially the same as those of Fig. 2. The control circuit 6 of Fig. 3, like that of Fig. 2, may exercise such control over the low-pass filter 68 as to cause the reduction of the high-frequency components of the input signal, say, above about 2,500 cycles, at the high-volume levels of the low-frequency components of a signal such as that represented by the curves 2 and 4 of Fig. 1.

The wave filter 39 of Fig. 3 is essentially a high-pass half-section comprising a series capacitance 29, opposite sides of which are connected to the leads 80 and 115, and a variable simulated shunt inductance connected across the leads 80 and 81. The shunt inductance comprises an inductive-reactance tube 33, provided with a feed-back network connected between its anode or plate 60 and its control-grid electrode 61. The feed-back circuit, introducing a phase lag of approximately 90° between the plate voltage and the grid voltage of the reactance tube 33, at low frequencies comprises a series-connected inductance 30 and blocking condenser 32 connected across its anode or plate 60 and its control-grid electrode 61, and a resistor 31. The plate or output circuit of the tube 33, with its associated circuits, therefore, functions as an inductance. Equivalent circuits for effecting the result may, of course, be used. The anode 60 and the series-connected inductance 30 and blocking condenser 32 are connected, in parallel, to the lead 80 by a conductor 62, and the cathode 63 of the tube 33 is connected to the output lead 81 by a conductor 64.

In the system of Fig. 3, therefore, the filters 68 and 39 are both of the all-reactance type. The reactance tube 8 simulates a variable capacitance, and the reactance tube 33 a variable inductance.

The resistor 31 is connected between the control circuit 6 and the grid 61 by a conductor 27, similarly to the connection of the resistor 12 to the grid 55 by the conductor 23. The conductor 28 corresponds similarly to the conductor 24. The control circuit 6 thus controls the high-pass filter 39 similarly to the control of the low-phase filter 68.

The output connections of the control circuit 6 to the filter 39 may embody an additional R-C filter 65 for the control voltage applied from the control circuit 6 to the high-pass filter 39. The filter 65 is shown comprising a shunt capacitance 26 and a series resistance 66. Though not absolutely necessary, the presence of this additional filter 65 permits of slower control of the low-frequency range by the high-pass filter 39 than of the high-frequency range by the low-pass filter 68. This also reduces a tendency to introduce spurious components into the high-pass filter 39 as a result of the control action.

The control circuit 6 of Fig. 3 is shown as of a slightly different type, in that the rectifier 9 is connected in parallel with the parallel-connected condenser 14 and resistor 13, instead of in series therewith. These control circuits are interchangeable, and may be used in the systems of any of the figures, with or without extra amplifiers or filters.

The variable low-pass filter 69 shown in Fig. 4, as a modification of the low-pass filters 55 and 68 of Figs. 2 and 3, has improved characteristics. The series arm of the filter containing the inductor 10 is tuned by means of a parallel-connected capacitor 38 to provide a parallel-resonant circuit. This provides an $m$-derived filter with a corresponding fixed point of high or substantially infinite attenuation above cut-off of the normal transmission range, where the capacitor 38 resonates with the inductor 10. This is represented at *a* in Fig. 5. The attenuation of the filter above cut-off becomes thereby improved. By eliminating the tuning condenser 38 in the series arm, the fixed point of high attenuation may be eliminated, if unnecessary for the particular application, as in the systems of Figs. 2 and 3.

A second inductor 34, connected in series with the conductor 25, and therefore in series with the variable reactance of the reactance tube 8, forms a series-resonant circuit with the simulated capacitance of the reactance tube 8. This provides a point of high or substantially infinite attenuation which may be just above the cut-off frequency of the normal transmission range, represented in Fig. 5 as *b*, *c*, or *d*, that varies as a function of the capacitance of the reactance tube 8 and, consequently, with the cut-off frequency. This variable point may vary in a predetermined relationship with respect to the cut-off frequency. It may vary from a low value, such as 2,500 cycles, to a high value, such as 8,000 cycles or higher, depending upon the characteristics and the limitations of other parts of the system. A resistor 37 may be connected in the output circuit of the reactance tube 8.

Each of these fixed and variable cut-off points assures an extremely sharp cut-off. This filter, therefore, provides unusually sharp cut-off and unusually high attentuation above cut-off, allowing of rapid control.

The three curves of Fig. 5 illustrate a typical operating range for the filter of Fig. 4, the curves *e* and *g* representing typical cut-off characteristics for maximum and minimum attenuation, determined by the amplitude of the input signal, and the curve *f* illustrating an intermediate cut-off characteristic. The cut-off curves *e*, *f*, and *g* may, of course, have other shapes in the cut-off region, such as are represented by *m* and *n* in Fig. 6. For each variable cut-off frequency of the filter of Fig. 4, there is a corresponding variable point of very high, or substantially infinite, attenuation, represented at *b*, *c*, and *d*, respectively, caused by the series resonance of the inductance 34 and the capacitance of the reactance tube 8, and limited only by the loss of the circuit. The point of substantially infinite attenuation varies in predetermined relationship with the cut-off frequency. There may also be a fixed point of high, or substantially infinite, attenuation, as at *a*. This circuit, therefore, functions as a double-*m*-derived filter having an exceedingly sharp variable high-frequency cut-off characteristic with a very high degree of attenuation above cut-off, and it may have a predetermined amount of resonance in the region of cut-off, thus to increase the response in that region. This type of filter may be varied very rapidly, in accordance with the control voltage or current, without introducing spurious components of the control voltage into the output circuit of the filter.

As shown clearly in Fig. 5 and in accordance with the previous discussion concerning Fig. 1 and the desirable characteristics for a system of the character described, it will be noted that the circuit as shown in Fig. 4 is capable of producing high degrees of attenuation above a certain frequency such as 2,500 cycles while maintaining substantially constant transmission at low frequencies.

The fixed point *a* of high attenuation should generally be placed above the normal operating range. For reproducing ordinary shellac phonograph records, which contain frequencies up to approximately 8,000 cycles, 9,000 cycles is a good value for this purpose. If the system is to be used also for the reception of amplitude-modulated radio broadcasts, 10,000 cycles, which is the difference between adjacent channels, is a desirable value, as the 10,000-cycle attenuation will reduce also the heterodyne whistles. For program sources involving higher frequencies, of course, this fixed attenuation point *a* may be set at a still higher frequency.

The said fixed and variable points of high attenuation are points at each of which the attenuation reaches a maximum with respect to adjacent higher and lower frequencies, and are determined by series or shunt resonance in one of the filter arms. If the resonant circuits causing the points of high attenuation had no loss whatever, or no resistive component, the attenuation at these points would be infinite.

Any impedance connected to the input leads 50 and 51, such as the pick-up 19, or any interposed amplifier or network, may have an impedance sufficiently low so as to provide a certain amount of resonant rise in the filter characteristic below cut-off, or less than critical damping for the resonant circuits in the filter. This condition is shown by *n* in Fig. 6 as previously described in connection with Fig. 2. This tends to provide a certain amount of compensation to the ear for the cut-off of the higher frequencies under conditions where frequencies that might be audible may be attenuated, as may occur upon the application of a sudden loud transient.

The resonant effect is improved by connecting a high impedance across the leads 80 and 81. This condition of resonance may exist at high-signal levels only momentarily, while the cut-off characteristic is shifting to a higher frequency. The resonant condition is therefore not apparent to the ear as such.

The condenser 102 increases high-frequency attenuation by forming a full $\pi$-section with the other filter arms. This condenser may be used in any of the circuits shown.

A condenser 35 may be connected in series with the inductance 34 or with the lead 25 in series with the reactance tube 8. It may be used for blocking or tuning purposes only, or it may be utilized also to improve the control characteristics of the filter. If used, it will, in effect, form a high-pass filter with the inductance 10. This filter will shunt to the low-voltage side of the system, through the input circuit of the filter, any spurious low-frequency-audio components of the control voltage that may reach the control grid 55 from the control circuit 6, and that might otherwise have appeared at the output terminals 17 and 18.

As shown in Fig. 4, the grid 55 and the condenser 11 are connected in parallel to the output lead 80 through the series-connected inductor 34 and capacitor 35, and the cathode 57 of the tube 8 is connected to the input lead 51 and the output lead 81 by a conductor 58.

The action of this low-pass filter is particularly effective when the input circuit is connected to a relatively low impedance; and this, as already explained, will also improve the cut-off characteristic. Rapid control of the circuit may thus be attained without "thumps" or other audio components of the control voltage applied to the grid 55 that might appear in the output circuit.

Typical alternative methods of connecting condenser 35 are shown in Figs. 2 and 3. In each case, the condenser prevents low-frequency surges appearing in the plate of the reactance tube 8 as a result of the control action from being transmitted to the output terminals 17 and 18.

The control circuit of Fig. 4 is shown including extra amplification 100 and filtering 7 to provide optimum control characteristics. This may be in accordance with the characteristics of the human ear, or for any desired range of frequencies. The control circuit may pass frequencies outside of the controlled range only, thus providing improved discrimination against noise.

The input-filter network 7 embodied in the system of Fig. 4 is shown comprising a condenser 97 and a resistor 21 connected in series in the control-input conductor 52, followed by a capacitor 22 and a resistor 99 connected in parallel across the circuit, to reduce the sensitivity to very high and low frequencies. The filter 7 is connected in the input circuit of the amplifier 100 for increasing the magnitude of the control voltage and also for providing additional filtering. The amplifier 100 may comprise a vacuum tube 93 the output circuit of which is provided with a resistor 95. A condenser 96 in parallel with the resistor 95 further reduces the high-frequency response. A series condenser 94 in the input circuit of the control circuit 6, serving as a blocking condenser between the amplifier 100 and the control circuit 6, may function also to reduce the sensitivity at low frequencies.

The function of the shunt capacitors 22 and 96 is to reduce the sensitivity of the control system at very high frequencies, so that the control shall be essentially in accordance with frequencies where the ear is most sensitive. The function of the series capacitors 97 and 94 is to reduce the response at very low frequencies below the cut-off frequency, where the ear is relatively insensitive, and most of the signals may consist of a rumble, hum, or other components. These condensers 14, 92, 97 and 94 may be used in any of the circuits shown. Essentially the result of the control of the circuit may be to approximate to the sensitivity characteristics of the ear for the type of signal to be reproduced.

More elaborate filter and amplifier circuits may be used where warranted.

All the tubes are operated within their normal ratings.

The control circuit 6 utilizes an accompanying output filter for filtering the control voltage comprising a series resistor 91 and a parallel capacitor 92, to provide better filtering of the rectified control voltage, thus increasing further the speed of control, without introducing spurious "thumps" into the output.

The following typical values of the elements employed in the system of Fig. 4 have been found to be very effective, in practice:

| | |
|---|---|
| Inductor 10 | 2 henries |
| Capacitor 38 | 140 micromicrofarads, approximately |
| Inductor 34 | 0.4 henry |
| Capacitor 35 | 0.01 microfarad |
| Capacitor 11 | 60 micromicrofarads, approximately |
| Vacuum tubes 8 and 93 | 6SJ7 |
| Resistor 37 | 150,000 ohms |
| Resistors 12 and 91 | 1 megohm |
| Resistor 13 | 5 megohms |
| Capacitor 14 | 0.01 microfarad |
| Capacitor 92 | 0.003 microfarad |
| Resistor 95 | 250,000 ohms |
| Capacitor 94 | 300 micromicrofarads |
| Resistors 21, 99, and 104 | 500,000 ohms |
| Capacitors 97 and 102 | 500 micromicrofarads |
| Capacitors 22 and 96 | 200 micromicrofarads |
| Rectifier 9 | 6H6 |
| Source impedance $Z_1$ | 35,000 ohms, approximately |
| Load impedance $Z_2$ | 0.5 megohm, approximately |

Other variations of constant-$k$, $m$-derived, lattice-type, and other filters, and various other networks, such as parallel-T, bridge-T, etc., which provide characteristics similar to filters, may also be used, provided that they control the frequency response in the manner described. Practically any combination of high-pass and low-pass filters may be used together. The low-pass filters of the systems of Figs. 2 and 4, for example, may be substituted in the system in Fig. 3. As with most filters, moreover, those shown may be operated in either direction, that is, with the input terminals 15 and 16 and the output terminals 17 and 18 interchangeable. In either case, the terminating impedance $Z_1$ of the filter will be on the mid-series side, and the terminating impedance $Z_2$ on the mid-shunt side, of the filter. The various filter half-sections may be connected together to form T or $\pi$ sections.

Fig. 13 shows one of the many possible arrangements incorporating a parallel-T network in place of the parallel-resonant circuit comprising the inductor 10 and the capacitor 38 in the series arm. Alternative connections for the reactance tube 8 are also shown, combining the inductance 34 of Fig. 4 with the reactance tube of Figs. 2 and 3. The filter 69 of Figs. 13, 14 and 15 may be substituted directly for the filter 5 of Fig. 2, the filter 68 of Fig. 3 or the filter 38 of Fig. 4.

One of the parallel T's of Fig. 13 is shown comprising series resistors 210 and 211 and a capacitor 215 connected in shunt between them. The other T is shown comprising series capacitors 213 and 214 and a resistor 212 connected in shunt between them. A shunt capacitor 102 is shown by dotted lines to indicate that it may be omitted, if desired.

This parallel-T network of Fig. 13, as is well known, may provide a null point or a point of high attenuation in the transmission characteristic. Typical, but not exclusive values for such a null are:

Capacitor 213=capacitor 214=½ capacitor 215
Resistor 210=resistor 211=2 resistor 212

The null point, with this combination, will occur at the frequency where the reactance of the capacitor 215 equals in magnitude the resistance of the resistor 212.

Such a network has a phase shift passing through zero at the null point and of opposite sign at frequencies above and below the null point.

Fig. 14 shows another arrangement, in which two reactance tubes are used to form a complete $\pi$ section. The connections to the reactance tube 8 are similar to those in Fig. 13, but with the alternative placement of the condenser 35. The reactance tube 108 is similar to reactance tube 8 of Fig. 2, with the reference numerals augmented by 100. This reactance tube 108 and the condenser 102 of Fig. 13 perform a similar function, that is, to provide additional high frequency attenuation. The reactance tube is preferably to the fixed condenser when wide-frequency ranges must be covered.

The series and shunt resistors 180 and 181 at the input of the circuit of Fig. 14 form an attenuator to reduce the signal level applied to the reactance tubes to prevent overloading and consequent distortion. This attenuator changes the ratio of the signal voltage applied to the reoctane tube to the control voltage available from the control circuit 6. The amplifier 100 of Fig. 4 performs this same function.

Fig. 15 shows another possible arrangement comprising a $\pi$ section, the series arm comprising the resistor 180, the first shunt arm comprising the inductor 110 and the capacitor 138, and the second shunt arm comprising two reactance tubes 8 and 108.

Series resonance between the inductor 110 and the capacitor 138 may perform the same function of providing a point of high attenuation as parallel resonance between the inductor 10 and the capacitor 38 in the system of Fig. 4, for instance. The second reactance tube 108 functions as in the system of Fig. 14. The resistor 181, with the resistor 180, also functions as in the system of Fig. 14.

Many other equivalent arrangements will readily occur to anyone skilled in the art.

Another method of controlling the response, combining the fixed filter with a variable-resistance tube, is illustrated in the system of Fig. 12, comprising a variable filter, but the results correspond more to those obtained with the aid of a variable amplifier, more fully described hereinafter. The filter is similar to that of Fig. 4, but the elements are fixed in value, the capacitance 35, for example, being larger than in the system of Fig. 4 for similar characteristics. The shunt arm of the filter contains a variable-resistance tube 125, either with or without a feedback circuit, shown by dotted lines as comprising a capacitor 123 and a resistor 124 connected in series across the grid. The effect of the filter arm is thus varied by varying the impedance of the tube 125 by means of a control voltage from the control circuit 6. The same method may be applied to the control of the filters shown in Figs. 2, 3 and 11.

The systems so far described have been rendered variable with respect to the overall-frequency range by means of filter circuits having variable circuit elements, thus allowing of operation at any of an unlimited number of frequency ranges falling within two sets of limits, one set relatively wide, the other relatively narrow. It is not essential to the carrying-out of the invention, however, to employ variable filters, such as the filters 5, 68, and 69. A similar result may be obtained by other circuit means; for example, means comprising controlled amplifiers providing signal-transmission paths.

The system of Fig. 9 embodies two amplifiers 40 and 41, connected in parallel. The input of the amplifier 40 is connected to the input terminals 15 and 16 by the conductors 50 and 51, and its output is connected to the output terminals 17 and 18 by the conductors 80 and 81. The amplifier 41 is connected to the conductors 50 and 51 by input conductors 71 and 72 and to the output conductors 80 and 81 by output conductors 73 and 74.

The amplifier 40 is of the fixed type, having a limited or restricted frequency range, such as up to 2,500 cycles. The amplifier 41 is of the variable-gain type, covering ranges above these predetermined limits, and it is rendered operative by the control circuit 6 and its associated filter 7 (if employed) only when the applied signal is sufficiently strong. It therefore reproduces the high-frequency components beyond the normal range of the fixed amplifier 40, under the control of the level of the signal.

The signals are thus passed through two transmission paths or channels represented by the amplifiers 40 and 41. The transmission characteristics of one of the transmission paths are so determined by the filter or other components as to include frequency ranges normally attenuated in the other path, but desirable for the reproduction of high-level sounds. If one of the paths is low-pass, for example, the other is high-pass. In the system of Fig. 9, the filter associated with the amplifier 40 is low-pass, and the filter associated with the amplifier 41 is high-pass for the control of high frequencies only. Typical circuit configurations are shown in Fig. 11.

As explained above, with a particular type of signal, the filter 7 may be eliminated entirely. The filter 7 may be eliminated under other conditions also, as when the control circuit 6 is controlled by the output of the amplifier 40, similarly to the operation of the system of Fig. 8.

The control of the control circuit 6, actuated, as before described, in accordance with the amplitude of the applied signal, is such as to permit the restricted-range amplifier 40 to operate only at low levels, and both amplifiers to operate at high levels. The overall response of the system will thus vary with the level of the applied signal. Those frequencies only will tend to be included that are necessary for satisfactory reproduction of the signal at the volume level existing at any particular moment. At low-volume levels, therefore, the restricted-range amplifier 40 is alone in operation. The high-frequency components, with their accompanying noises, are eliminated by reason of the inoperability of the amplifier 41, at this time, to transmit them.

Referring to the practical circuit illustrating the circuit of Fig. 9 that is shown in Fig. 11, the range of the fixed amplifier 40 is restricted by a low-pass filter comprising a series inductor 78 and a shunt capacitor 45. The filter is connected, in any desired manner, to the input circuit of an amplifier vacuum tube 75. The amplifier 41 is shown associated with a filter comprising a series capacitor 46 and a shunt resistor 47. This filter may be connected in any desired manner, to the input circuit of an amplifier vacuum tube 203.

According to the system of Fig. 10, both amplifiers 75 and 42 are variable. The fixed amplifier 40 of Figs. 9 and 11 is replaced by the variable-gain amplifier 75, having a narrow range, representing only the minimum range required for low-volume-level reproduction. It may provide for increase in amplification in a portion of this range, as by means of a resonant filter (not shown). This would maintain balance. The variable-gain amplifier 41 is replaced by the variable-gain amplifier 42 having a wide range, operating at high-volume levels, for transmitting the entire range of frequencies that are desirable for high-level reproduction. The control circuit 6 is connected to the variable amplifier 42 in the same way as to the variable amplifier 41 of Fig. 9. The control circuit 6 is connected also, however, to the variable-gain amplifier 75 by corresponding separate control-output conductors 76 and 77.

The filter 7 (if employed) and the control circuit 6 turn on the wide-range amplifier 42 in the same manner that they turn on the amplifier 41 of Fig. 9. They turn off the narrow-range amplifier 75 through the control-output-connecting conductors 76 and 77 when the signal contains strong frequency components within the range of the narrow-range amplifier 75. At low-volume or low-intensity levels, therefore, the restricted range of the amplifier 75 will reduce or attenuate the high-frequency components. At the high levels, the amplifier 75 will become substantially ineffective, and a wide-range amplifier 42 will then alone function. The combined frequency characteristics of the two amplifiers 75 and 42, under these conditions, should be such as to provide the desired overall response at any particular intermediate level. In the system of Fig. 10, therefore, the control circuit 6 renders one of the amplifiers 75 and 42 substantially ineffective when the other is effective, and vice versa.

The filter 7 insures that the control shall be in accordance with signals in the narrow range. In the system of Fig. 10, too, under certain circumstances, the filter 7 may be eliminated, or the control circuit 6 may be actuated from the output of the narrow-range amplifier 75.

The main advantage of the system of Fig. 10 over that of Fig. 9 is that the narrow range may contain a certain amount of resonance, thus improving the reproduction in the neighborhood of the cut-off frequency at low levels. Such resonance, however, is undesirable at high levels, under which conditions the amplifier 75 is essentially turned off.

It is also possible to reduce the frequency range by phase reversal. The amplifier 40 of Fig. 9, for example, may have a wide range, and the output of the amplifier 41 may have a narrow range, reversed in phase, so as to reduce the overall range of the system.

In the case of amplifiers, as when variable filters are used, it is generally desirable to obtain the system shift from narrow-range to wide-range reproduction at a high rate of speed.

Essentially similar results, therefore, so far as steady-state conditions at low and high levels are concerned, may be obtained with either variable filters or variable amplifiers.

There is one important distinction between the operation of variable filters, as characterized by the system of Fig. 5, and the operation of variable amplifiers or variable filters in which variable resistive elements are varied. In a filter such as illustrated in Fig. 5, either with or without points of high attenuation, the variation takes the form of a variation of cut-off frequency, and rapidly increasing attenuation above that frequency. With variable amplifiers, or with filters employing variable resistance, the cut-off frequency remains substantially fixed, and the change in the all-over transmission characteristics is accomplished mainly by varying the attenuation above the cut-off frequency. While both systems will operate in substantially the same manner at the extremely low and high levels, it is obvious that, at intermediate levels, the characteristics will be somewhat different. Under these circumstances, the variable filter is generally more desirable since, under all conditions, it maintains substantially constant transmission up to the cut-off point, thus providing the best signal-to-noise ratio.

The advantages of the present invention may thus be realized in several different general forms, typical examples of which have been illustrated as utilizing either variable filters, or fixed filters with variable-gain amplifiers. Choice between one or another form depends upon the type of signal to be reproduced, as well as upon other considerations. In some cases, a combination of the two types may be justified. Various combinations of fixed and variable filters and amplifiers also may be utilized, unbalanced or push-pull. A variable filter may be employed to control one range of frequencies, for instance, and a variable amplifier to control another range of frequencies, or vice versa.

In accordance with usual conventions in the showing of vacuum tube circuits, the well-known operating-voltage sources, like batteries, power supplies, voltage dividers, bias resistors, transformers, and the like, are not illustrated. It will also be understood that, in any practical system, it may be desirable to add amplification or attenuation, so that the best operating conditions may be obtained.

Further modifications will also occur to persons skilled in the art, and all such are considered to fall within the spirit and scope of the present invention, as defined in the appended claims.

What is claimed is:

1. In the transmission of signals having relatively-high-frequency components and relatively-low-frequency components, a method of the character described that comprises reducing the relatively-high-frequency components slowly when the level of the relatively-low-frequency components falls below a predetermined value, and restoring the relatively-high-frequency components substantially instantaneously when the level of the relatively-low-frequency components exceeds a predetermined value.

2. An electric system having, in combination, an input circuit, an output circuit, means for impressing upon the input circuit signals having relatively-high-frequency components of substantial intensity and relatively-low-frequency components, and comprising means controlled from the input circuit effective when the level of the relatively-low-frequency components falls below a predetermined value to reduce the relatively-high-frequency components to a degree dependent upon the level of said relatively-low-frequency components to follow rapidly dynamic variations in the low-frequency signal level.

3. An electric system having, in combination, means for transmitting signals having relatively-high-frequency components of substantial intensity and relatively-low-frequency components, the transmitting means being effective to transmit the relatively-low-frequency components continuously, and comprising means controlled from the input circuit effective when the level of the relatively-low-frequency components falls below a predetermined value to reduce the relatively-high-frequency components to a degree dependent upon the level of said relatively-low-frequency components.

4. In an electric system for reproducing signals having relatively-high-frequency components of substantial intensity and relatively-low-frequency components, a method of the character described that comprises reducing the relatively-high-frequency components when the level of the relatively-low-frequency components falls below a predetermined value, and controlling the degree of reduction in continuous and rapid accordance with dynamic variations in said level of said relatively-low-frequency components.

5. An electric system having, in combination, means for transmitting signals having relatively-high-frequency components of substantial intensity and relatively-low-frequency components, the transmitting means comprising means effective to transmit the relatively-low-frequency components continuously without reduction and effective when the level of the relatively-low-frequency components falls below a predetermined value to reduce the relatively-high-frequency components and controlling the degree of effectiveness of the reducing means in accordance with variations in the level of said relatively-low-frequency components.

6. A system for transmitting unmodulated signals comprising relatively-high-frequency components and relatively-low-frequency components and comprising a filter having at least two arms, one of said arms comprising an inductance and the other of said arms comprising a reactance tube having at least three electrodes, including at least one control electrode, feedback means whereby the impedance between two of said electrodes simulates a variable reactance controllable by a control voltage applied between said control electrode and at least one of the other said electrodes, said filter having a variable cutoff determined and controlled by said variable reactance, means comprising a filter for selecting said relatively-low-frequency components, means rectifying said relatively-low-frequency components, a capacitance, means applying rectified voltage to said capacitance and charging said capacitance at a predetermined rate, means discharging said capacitance at a second predetermined rate, means applying said charge on said capacitance between said control electrode and said other electrode of said reactance tube in order to vary the response of said filter continuously in accordance with said relatively-low-frequency components by raising said cutoff substantially instantaneously in accordance with any increase in said relatively-low-frequency components and lowering said cutoff at a relatively slower rate in accordance with any decrease in said relatively-low-frequency components.

7. A system for transmitting unmodulated signals comprising relatively-high-frequency components and relatively-low-frequency components and comprising a filter having at least two arms, one of said arms comprising an impedance and the other of said arms comprising a reactance tube having at least three electrodes, including at least one control electrode, feedback means whereby the impedance between two of said electrodes simulates a variable reactance controllable by a control voltage applied between said control electrode and at least one of the other said electrodes, said filter having a variable cutoff determined and controlled by said variable reactance, means comprising a filter for selecting said relatively-low-frequency components, means rectifying said relatively-low-frequency components, a capacitance, means applying rectified voltage to said capacitance and charging said capacitance at a predetermined rate, means discharging said capacitance at a second predetermined rate, means applying said charge on said capacitance between said control electrode and said other electrode of said reactance tube in order to vary the response of said filter continuously in accordance with said relatively-low-frequency components by raising said cutoff substantially instantaneously in accordance with any increase in said relatively-low-frequency components and lowering said cutoff at a relatively slower rate in accordance with any decrease in said relatively-low-frequency components.

8. An audio frequency system with background noise control comprising, in combination, a main channel for translating audio frequency signals, filter means connected across the main channel comprising fixed and variable elements for attenuating signals of the high audio frequency range without substantial attenuation of mid range audio frequency signals, a second channel in parallel with the main channel having filter means therein for selecting mid-range audio frequencies having the fundamental frequencies of music but excluding high frequency noise, means for rectifying said selected mid-range audio frequency signals, a capacitor connected across the output of said rectifying means to be charged thereby, and means utilizing the charge on the capacitor for varying the attenuation of signals of the high audio frequency in the main channel in inverse relationship to the charge on said capacitor, whereby to reduce the attenuation thereof when the strength of mid-range audio signals in the channel is increased.

9. In combination, a main channel for translating audio frequency signals, a control circuit connected across the main channel having filter means therein for attenuating audio frequencies of the high and low frequency ranges and means to select mid-range frequencies containing the fundamental frequencies of music inclusive of high frequency music, means for rectifying the mid-range signals providing rectified energy for control purposes, first circuit means including a condenser across the output of said rectifying means for instantaneously storing said energy, second circuit means for discharging the stored energy relatively slowly, a network for controlling the effective reactance in the main channel, and means connecting the first and second circuit means to said reactance network to utilize the control energy for controlling the network whereby upon increase of midrange signal energy instantaneously to enhance at least the high frequency response and to reduce it at a lesser rate.

HERMON H. SCOTT.

REFERENCES CITED

The following references are of record in the file of this patent:

UNITED STATES PATENTS

| Number | Name | Date |
|---|---|---|
| 1,979,035 | Hammond, Jr. | Oct. 30, 1934 |
| 2,008,702 | Hammond, Jr. | July 23, 1935 |
| 2,009,229 | Hammond | July 23, 1935 |
| 2,017,270 | Yolles | Oct. 15, 1935 |
| 2,040,954 | Roberts | May 19, 1936 |
| 2,045,300 | Koch | June 23, 1936 |
| 2,072,708 | Case | Mar. 2, 1937 |
| 2,096,758 | Purington | Oct. 26, 1937 |
| 2,148,030 | McLennan | Feb. 21, 1939 |
| 2,173,222 | Belar | Sept. 19, 1939 |
| 2,241,581 | Boucke | May 13, 1941 |
| 2,243,921 | Rust et al. | June 3, 1941 |
| 2,262,846 | Herold | Nov. 18, 1941 |
| 2,369,952 | Devine | Feb. 20, 1945 |